W. J. ELLIS.
Seed-Planter.

No. 213,639.      Patented Mar. 25, 1879.

WITNESSES:
W. W. Hollingsworth
John C. Vernon

INVENTOR:
Wm J. Ellis
BY
ATTORNEYS.

UNITED STATES PATENT OFFICE.

WILLIAM J. ELLIS, OF OAKLAND, GEORGIA.

IMPROVEMENT IN SEED-PLANTERS.

Specification forming part of Letters Patent No. 213,639, dated March 25, 1879; application filed December 14, 1878.

*To all whom it may concern:*

Be it known that I, WILLIAM J. ELLIS, of Oakland, in the county of Meriwether and State of Georgia, have invented a new and useful Improvement in Seed-Planters; and I do hereby declare that the following is a full, clear, and exact description of the same.

My invention is an improvement in the class of seed-planters in which a rotating hopper is employed.

My rotating hopper has a number of seed-pockets, which are provided with radial open-ended tubes, into the inner ends of which the seed is conducted or guided by a series of inclined plates, one of which is arranged beside each of said tubes. The hopper is placed in rear of a plow or furrow-opener, and rotates by frictional contact with the ground, being journaled in a frame which is pivoted to the plow-stock, so that the hopper may rise and fall freely, and thus follow the inequalities of the ground-surface. A seed-coverer is also pivoted to the plow-beam by means of a curved bar, and follows the undulations of the surface.

Figure 1:
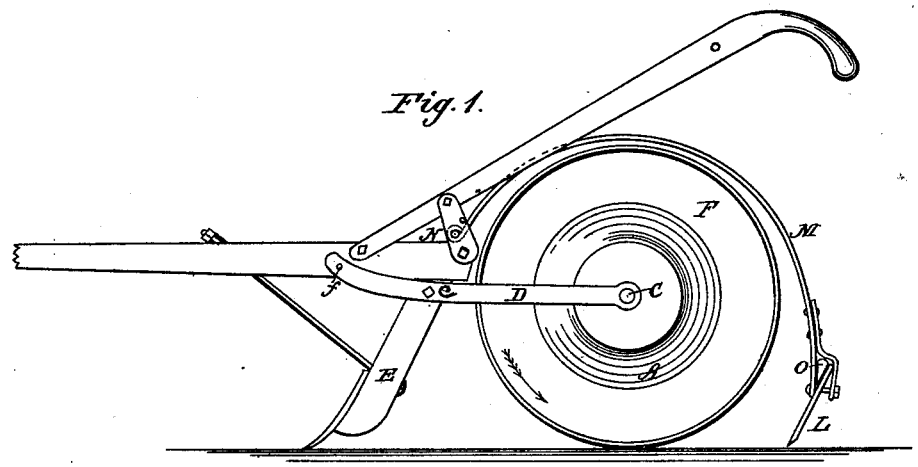
Figure 2:
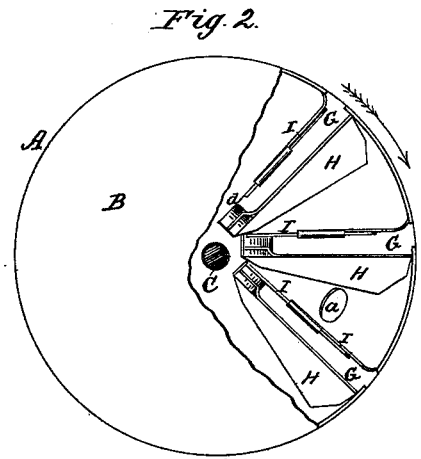
Figure 3:
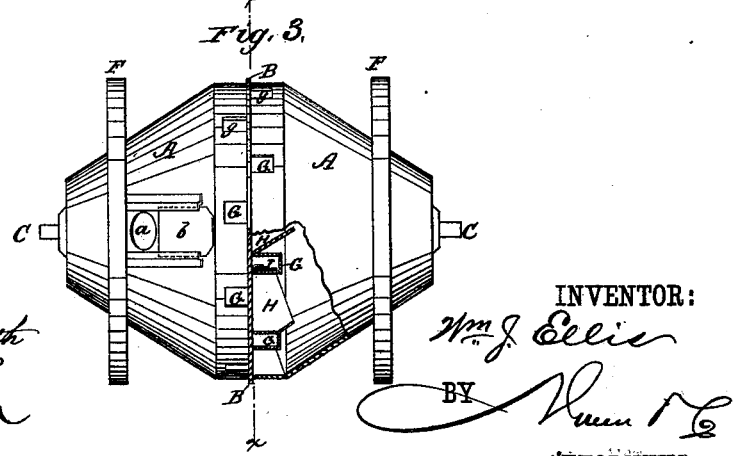

In the accompanying drawings, forming part of this specification, Figure 1 is a side view of a plow and my improvements attached thereto. Fig. 2 is a cross-section on line $x\ x$ of Fig. 3. Fig. 3 is a plan view of the revolving hopper, with part of its casing or shell broken out to show the interior arrangement.

The revolving hopper is composed of two hollow cones or conical frusta, A A, placed with their bases opposite, and separated only by a disk or circular plate, B, thus forming a seed-compartment on each side of the latter, and into which the seed may be introduced through openings $a$, having slide $b$. The hopper has an axis, C, whose ends are journaled in bars D, which are pivoted at $c$ to the plow-standard E. Wheels F are fixed on the outer ends of each cone A, and its diameter is the same as the partition B, or central portion of the hopper. Each cone A has a series of radial seed-discharge tubes, G, whose outer ends are open and terminate in the periphery of the base of the cones. The tubes are open on the side next the partition B, with which they are in contact, so that the partition forms such fourth side thereof.

The tubes G have an opening, $d$, at their inner ends, and a wing-shaped or triangular plate, H, is arranged alongside each tube on the side opposite that having such opening, and at an angle to the disk B of thirty degrees, more or less. The function of these plates H is to successively take up and convey to the openings $d$ of the tubes G a quantity of seed or grain at each rotation of the hopper, for, as will be readily seen, a seed trough or conductor is formed by reason of the angle of the plates H with the partition B, and as the hopper rotates the lower end of each wing H enters the seed, which is held by gravity in the bottom of the hopper, and takes up a portion, which, as the continued rotation of the hopper carries up the outer end of the plate, slides down the trough toward the axis C, and enters the opening $d$ in the end of the opposite seed-tube G.

The amount of grain allowed to enter the tubes is regulated by the slides I, which are narrow plates held in guides in the inner side of the tubes. The slides may be adjusted from the outside of the hopper by means of any suitable device.

As before stated, the hopper is fixed on an axis, C, which has its bearings in a frame consisting of two parallel bars, D D, whose forward ends are pivoted to the plow-stock. Thus the rear end of frame D is free to rise and fall, to allow the hopper A to follow the inequalities of the surface as it rolls in the furrow made by the plow, and that its operation or action is the same whether the plowshare runs deep or shallow.

The bars D extend forward of their pivot $c$, so that when it is desired to hold the hopper raised off the ground, it may be done by inserting a rod through the holes $f$ in the forward ends of said bars, and allowing the rod to bear or exert a leverage against the under side of the plow-beam. Before such rod can be inserted, it is obviously necessary to raise the hopper in order to lower the forward ends of the bars D.

I may employ some other device in place of the cross-rod—say an eccentric or cam—for the same purpose.

It is obvious the hopper-frame may be attached to or detached from the plow-stock by simply inserting or withdrawing the pivot-bolt. The apparatus therefore constitutes a cheap but efficient and easily-applied seeding attachment for ordinary plows, and may be used for planting corn, pease, millet, cotton-seed, &c.; also for depositing guano or other fertilizers. It is also obvious it may be used for planting different seeds at the same time, but in separate hills; also for planting corn or other seed and depositing guano at one and the same time. The seed-tubes alternate in position in the different compartments, so that two adjacent ones cannot discharge seed simultaneously.

To cover the seed in the furrow, I employ the hoe or covering plate L, which is secured to the forked free end of a curved or semicircular bar, M, that is pivoted to plates or bracket N, bolted to the rear end of the plow-beam, so that the coverer L will rise and fall with the hopper. The angle of the coverer to the plow-beam may be changed at will, to cause it to take more or less soil, and thus cover the seed more or less deeply. This adjustment is provided for by use of a wedge, O, which is inserted between the forks of the bar M, and may be placed in contact with the front or rear side of the hoe-blade, according to the adjustment required. The hoe is held in or attached to the said forks by screw-bolts.

I do not claim, broadly, the employment of a wedge for holding a cultivating implement indifferent adjustments.

What I claim is—

1. In a rotating seed-hopper, the combination, with the pockets of the seed-discharge tubes, made open at each end, and the seed guides or conductors arranged alongside said tubes, all operating substantially as described.

2. The combination of the conical or tapered portions A A of the hopper and the central partition, B, and the seed-tubes, one side of which is formed by said portion, all as shown and described.

3. The combination, with the plow stock and beam and rotating hopper, of the bars D D, which are pivoted to the stock just below the beam, and whose forward ends are extended beyond the pivot-bolt, and provided with holes to receive a cross-bolt, so that the hopper may be held off the ground when desired, the said cross-bolt in such case bearing against the under side of the beam, as hereinbefore specified.

4. The combination of the curved spring-bar M, having its free end forked, as specified, the hoe-plate L, attached loosely to the fork by cross-bolts, and the wedge O, all as shown and described, for the purpose specified.

WILLIAM J. ELLIS.

Witnesses:
 L. J. ELLIS,
 GEO. B. HUDDLESTON.